(12) United States Patent
Franklin

(10) Patent No.: US 6,840,216 B2
(45) Date of Patent: Jan. 11, 2005

(54) GOVERNOR FOR DIESEL ENGINE

(75) Inventor: Philip Clive Franklin, Bicester (GB)

(73) Assignee: Seneca Technology, Ltd., Grand Turk (GB)

( * ) Notice: Subject to any disclaimer, the term of this patent is extended or adjusted under 35 U.S.C. 154(b) by 0 days.

(21) Appl. No.: 10/448,787

(22) Filed: May 30, 2003

(65) Prior Publication Data
US 2004/0069270 A1 Apr. 15, 2004

(30) Foreign Application Priority Data
Jun. 1, 2002 (GB) .............................. 0213190

(51) Int. Cl.[7] .............................................. F02D 31/00
(52) U.S. Cl. ...................................... 123/364; 123/383
(58) Field of Search ................. 123/364, 367, 123/383

(56) References Cited

U.S. PATENT DOCUMENTS

| | | | | |
|---|---|---|---|---|
| 2,093,984 A | * | 9/1937 | Schweizer | 123/382 |
| 2,752,906 A | * | 7/1956 | Nicolls | 123/383 |
| 4,105,002 A | * | 8/1978 | Thoma | 123/364 |
| 4,350,128 A | * | 9/1982 | Boudy | 123/369 |
| 4,359,986 A | * | 11/1982 | Kramer | 123/383 |
| 4,372,268 A | * | 2/1983 | Kolarik | 123/383 |
| 4,449,500 A | * | 5/1984 | Kawatei et al. | 123/380 |
| 4,562,810 A | * | 1/1986 | Miyaki | 123/380 |
| 5,218,940 A | * | 6/1993 | Rodriguez et al. | 123/383 |

* cited by examiner

Primary Examiner—Thomas Moulis
(74) Attorney, Agent, or Firm—Artz & Artz, PC

(57) ABSTRACT

In a mechanical fuel pump control device for a diesel engine, air at intake manifold pressure is fed to an actuator that is used to control the amount of fuel being injected into the engine cylinders. The mechanism is designed such that an increase in air pressure reduces fuelling and a decrease in air pressure increases fuelling. By this means the engine's (rotational) speed is held substantially constant at a predetermined value, the variation in (rotational) speed with increasing load (speed droop) being controllable within the design by altering the effective rate of fuel increase for given pressure decrease. This mechanism may be mechanically linked to the operator's main control of engine output, such as (1) fully independently, so the governor will continue to operate to control engine fuelling if the engine's (rotational) speed falls below the predetermined value (commonly known as idle speed governing), or (2) so the operator adjusts elements within the mechanism such that the governor continues to function to control the fuelling to try to achieve the (new value of) intake manifold pressure (commonly known as all speed governing).

11 Claims, 3 Drawing Sheets

GOVERNOR FOR DIESEL ENGINE

TECHNICAL FIELD

The present invention relates to a governor, particularly for supercharged diesel engines for aircraft.

BACKGROUND OF THE INVENTION

Internal combustion engines are designed to operate over a range of rotational speeds. The lowest rotational speed, usually referred to as idle speed, is largely decided by the minimum sustainable rotational speed for combustion, given limitations on flywheel size, etc. The maximum rotational speed is partly constrained by the increasing inertia forces arising from rapidly rotating components and partly from the limits of combustion speed. All engines need to be controlled in some way to ensure that their rotational speed remains in this "envelope". Too low a rotational speed at any time during operation will risk engine stalling, which may have operational consequences ranging from inconvenient to disastrous. Whereas too high a rotational speed may cause structural failure of components and rapid destruction of the engine. For all engines, whether coupled to a load or not, an increase in engine rotational speed leads to an increase in energy losses from friction and viscous drag, etc.

For a throttled, carbureted petrol engine the extra air/fuel mixture drawn into the engine as a result of an increase in engine rotational speed is substantially less than the increase in rotational speed, resulting in a stable situation. At a fixed throttle setting such an engine will settle at a substantially constant rotational speed. With an applied load, such as when driving a vehicle direct to the road wheels, or a propeller on an aircraft, the system remains stable: the increase in engine load means that the throttle has to be set to a different position (more flow area for an increase in load or required speed) but this is the only input required from an operator. Those gasoline engines that use fuel injection have different requirements but typically have some form of governing built in, either electronically on modern systems, or generally using flyweights for older mechanical systems.

Unlike gasoline engines, diesel engines typically require some form of governor. This is because the different way the fuel is supplied leads to a different reaction to changes in engine rotational speed. For most diesel engines, the airflow through the engine is sufficient at all times to burn more fuel than is available from the fuel injection pump. The fuel delivery from the fuel injection pump therefore controls the engine's output and rotational speed.

For most types of fuel injection pump, the pump's volumetric efficiency, hence fuel quantity per injection at fixed setting, is designed to be greatest at mid-engine rotational speed to satisfy other operating requirements. Generally the engine's combustion efficiency will rise with increasing engine rotational speed, again the peak combustion efficiency usually occurring at mid-engine rotational speed.

Thus a small increase in engine rotational speed at idle results in more torque being available from the engine because of the greater fuel quantity being injected per injection; typically this increase in torque is greater than the increase in torque losses from viscous drag, etc. This is an unstable situation and such an engine will increase in rotational speed until the combination of fuel delivery and combustion characteristics changes so that torque produced is equal to torque absorbed.

When such an engine is connected to a load, the characteristics of the load influence the situation. Some loads have a more or less constant torque requirement as rotational speed increases, others, such as propeller loads, have rising torque characteristics.

Those loads that are more or less constant in torque, e.g. a slow heavy vehicle along a flat road, still result in an unstable situation. Such a vehicle would only be controllable because the driver notes an increase in vehicle speed and adjusts his input to the fuel pump. For a heavy vehicle the response time is long and a driver would easily be able to respond in time.

Those loads that increase in torque as engine rotational speed increases, e.g. a fast vehicle along a flat road, or driving a propeller, may well result in a stable system and have no requirement in such a situation for a governor. However a change in circumstances may well result in instability returning and a governor being required.

The usual requirement of a governor for accurate rotational speed control at idle without "hunting", requires mechanical governors to use substantial flyweights to provide enough change in force with small changes in engine rotational speed to be sure to overcome the friction forces present in the mechanism. This results in a heavy, bulky and costly mechanism with oil lubricated, accurately made parts to ensure low friction, an enclosure to keep the mechanism clean, and adjustment screws to enable idle speed to be accurately set.

Highly rated diesel engines require some form of supercharging to increase airflow through the engine hence enable more fuel to be burnt. Currently the preferred system is to use turbosupercharging, which gives the best compromise in fuel consumption, cost, complexity reliability and durability.

Four-stroke diesel engines do not require a positive pressure in the intake manifold (airchest), with respect to atmospheric pressure, under all conditions. Typically there will always be a slight pressure in the intake manifold relative to the pressure at the entry to any supercharger that may be fitted to the engine.

All two-stroke diesel engines do require a positive pressure across the cylinders at all times. It is this pressure that drives the airflow through the engine, providing fresh air to the cylinders to be burnt at each cycle. This requirement means that there is a positive pressure in the intake manifold (airchest), with respect to atmospheric pressure, at all times when the engine is running.

Given that the inlet ducting as far as the first stage of a supercharger can only be restrictive, the pressure difference between the intake manifold (airchest) and the point immediately before the first supercharger in the system will be slightly higher than the pressure difference between the intake manifold and the atmosphere. It is in the nature of all simple 2-stroke engines that these pressure differences will always increase as engine rotational speed increases.

For aircraft and other applications where weight and space are at a premium the use of a traditional governor with its heavy flyweights can be a severe disadvantage, yet electronics and electronic governors bring their own disadvantages such as cost, complexity and reliability.

Some fuel pumps use a hydraulic governor instead of flyweights; these pumps usually use the principle that fluid flow resistance increases as flow velocity increases. This results in a falling volumetric efficiency of the pump with engine rotational speed and simplifies control. However these pumps have their own inherent disadvantages that may make then unsuitable for certain applications.

In the past some diesel engines have been produced with throttles as part of a simple fuel control system. The throttle was controlled directly by the operator. The inlet manifold (airchest) depression was then used to move an actuator that was linked directly to the fuel control on the injection pump. The actuator was connected such that reducing inlet manifold pressure (i.e. increasing depression) moved the fuel control to less fuel. This resulted in a relatively simple, robust system that was stable under all usual operating conditions without the cost and complexity of a flyweight type of governor. However, this system is unsuitable for use with a highly rated, supercharged engine or with a 2-stroke and brings inherent disadvantages in terms of fuel consumption, oil consumption, transient response and emissions.

SUMMARY OF THE INVENTION

A supercharged internal combustion engine of the compression ignition type has a fuel pump that delivers metered quantities of fuel to fuel injectors. The fuel pump has a control unit fitted to it to enable the operator to vary the engine's operation by altering the amount of fuel delivered to the engine by the fuel pump.

An actuator is fed with air from the engine's intake manifold. The actuator is connected to the fuel pump control unit mechanism such that an increase in air pressure moves the fuel control mechanism so as to reduce fuelling. The mechanism is pushed towards the "more fuel" position by a spring, which is anchored at its other end to a static part of the control unit.

Advantageously the spring travel is limited by an end stop such that the correct quantity of fuel for starting is available when the actuator is in the position corresponding to "no pressure" in the intake manifold.

For those installations where "all speed" governing is beneficial, this may be provided by attaching the operator's input to the opposite end of the governor spring, rather than anchoring it to a static part of the control unit. When the operator demands more fuel the extra load in the spring overcomes the actuator until the force from intake manifold pressure once again balances the spring load.

Advantageously, when an all speed governor is provided, a second end stop in the other direction is provided in the linkage from the operator's input, such that the governor spring is not overstressed by requiring it to work at high loads when large fuel quantities are required and the engine's manifold pressure is high.

The governor spring may advantageously be of variable rate type, either rising or falling rate, to tailor the specific characteristics of the governor (speed droop, sensitivity etc) to the application. Although, of course, this adds to the cost of the unit and the complexity of its detail design. Nested springs may obviously also be employed to achieve specific spring characteristics not attainable any other way.

For those engines where the intake manifold pressure at high load conditions is very significantly greater than it is at idle speeds (which is true of highly rated turbocharged engines) there is advantageously provided a collapsible link to reduce the amount of effort required by the operator when demanding high fuelling. This link may consist of a spring preloaded such that it always overcomes the governor spring in its range of travel limited by its end stops, but somewhat above that load this collapsible link spring starts to deflect to reduce the effort required from the operator.

To provide an "overboost" limit to ensure the engine does not under any circumstances run with a boost pressure above a preset maximum, there may advantageously be provided a second collapsible link such that exceeding this preset boost pressure causes this second collapsible link to start collapsing, the mechanism being designed to thereby reduce fuelling to the engine. If required, this second collapsible link may incorporate a "snap-through" type spring so that exceeding this preset boost pressure causes a very rapid drop in fuelling. If desired this snap-through spring may have characteristics such that the unit may need to be "reset" before the engine may once more be restarted. Alternatively, it may have characteristics such that fuelling is reduced to a level that will allow the operator time to respond and adjust his input to ensure that the engine stays within its normal operating envelope.

In a mechanical fuel pump control device for a diesel engine, air at intake manifold pressure is fed to an actuator that is used to control the amount of fuel being injected into the engine cylinders. The mechanism is designed such that an increase in air pressure reduces fuelling and a decrease in air pressure increases fuelling. By this means the engine's rotational speed is held substantially constant at a predetermined value, the variation in rotational speed with increasing load (speed droop) being controllable within the design by altering the effective rate of fuel increase for given pressure decrease. This mechanism may be mechanically linked to the operator's main control of engine output in a number of ways. The two most usual ways being: (1) fully independently, so the governor will continue to operate to control engine fuelling if the engine's rotational speed falls below the predetermined value (commonly known as idle speed governing), or (2) so the operator adjusts elements within the mechanism such that the governor continues to function to control the fuelling to try to achieve the new value of intake manifold pressure, commonly known as all speed governing.

Other aspects and advantages of the present invention will become apparent upon the following detailed description and appended claims, and upon reference to the accompanying drawings.

BRIEF DESCRIPTION OF THE DRAWINGS

The invention is described with reference to the accompanying drawings in which.

DESCRIPTION OF THE PREFERRED EMBODIMENT(S)

Figure 1:
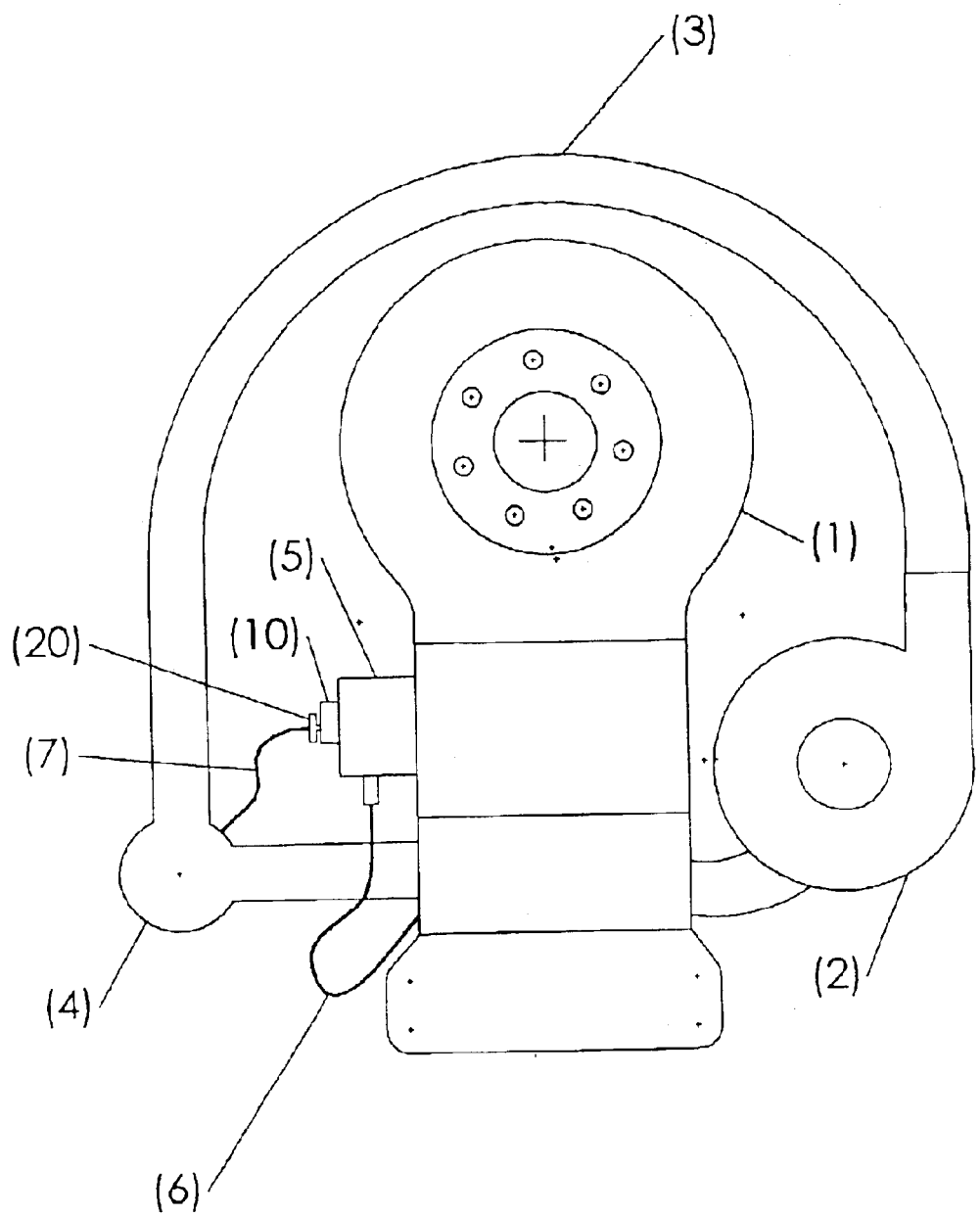
FIG. 1 is a schematic representation of a supercharged compression ignition engine with a fuel pump and governor mounted on it.

Referring to FIG. 1, a diesel engine has a crankcase 1 that contains the usual engine components. Air from the atmosphere is ducted through an air filter and intake ducting (not shown) to be compressed in a supercharger 2 and delivered via ducting 3 to intake manifold 4 and thence to the engine's cylinders (not shown). The supercharger may, if necessary, be followed by further stages of superchargers and intercoolers (not shown). A fuel pump 5 delivers fuel at high pressure through fuel pipes 6 to injectors (not shown) and hence into the combustion chambers of the cylinders (not shown). The intake manifold 4 is connected by pipe 7 to an actuator 20 that is attached to the governor housing 10 that is itself attached to the side of the fuel pump 5.

Figure 2:
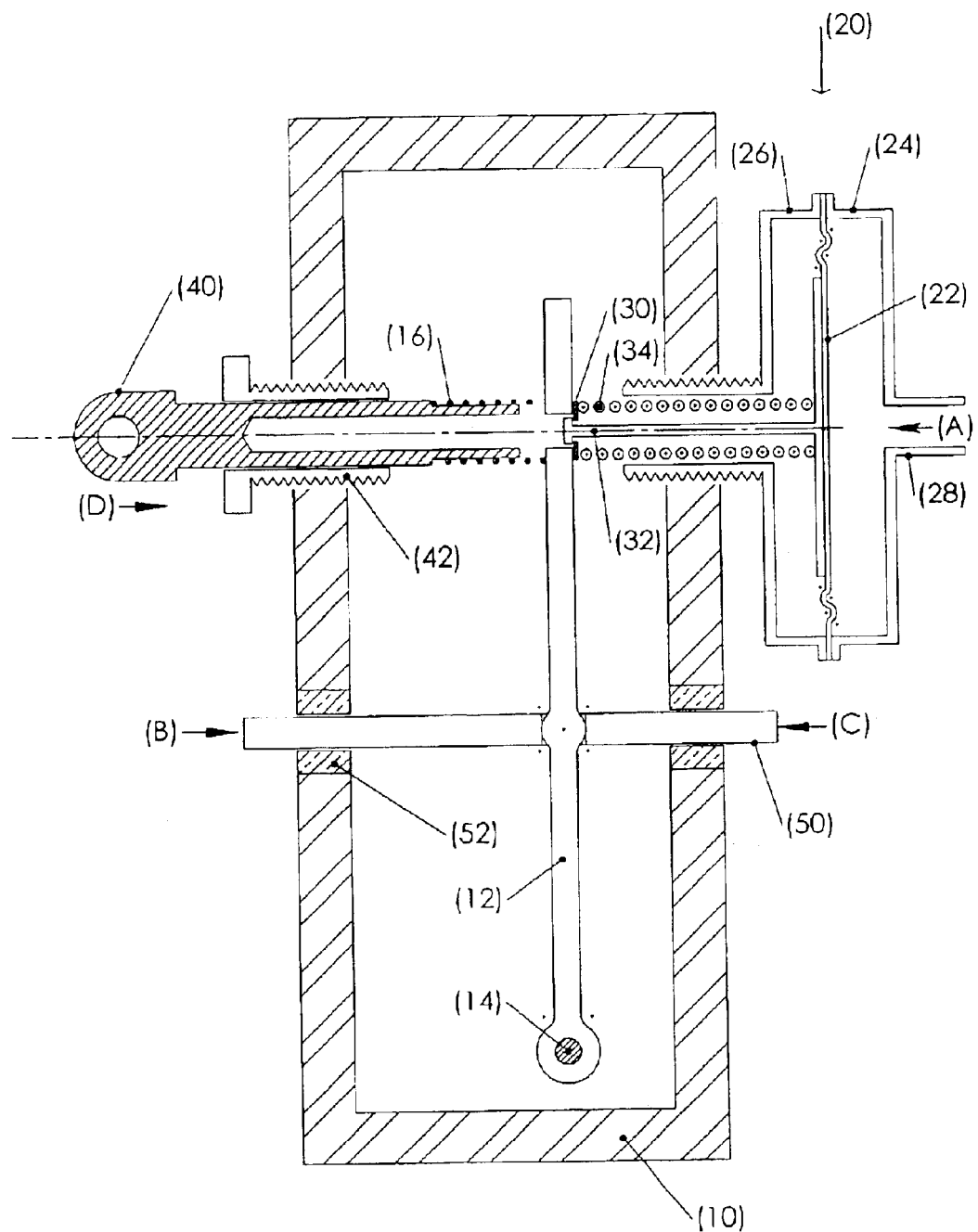
FIG. 2 is a schematic representation of one embodiment of the invention of the "force balance" type.

Referring now to FIG. 2, which shows a schematic view of one embodiment of the invention, the governor housing 10 is attached to the fuel pump housing (not shown in this diagram) and supports and/or contains the other parts. The diagram is drawn with the components in their relative positions coinciding with an idle condition of the engine. The governor lever 12 is rotatably supported upon a pivot pin 14 that is itself supported by the governor housing 10 (it may be firmly fixed or merely well located). The governor lever 12 is connected to the fuel pump control rod 50, the diagram showing a simple form of connection, such that angular rotation of the governor lever 12 causes movement of the fuel pump control rod 50. In the diagram clockwise rotation of the governor lever 12 causes translation of the fuel pump control rod 50 to the right. This fuel pump control rod 50 is then connected inside the fuel pump (not shown) such that translation to the right, in direction of Arrow B, will increase fuel delivery to the engine (per injection) and conversely translation to the left, in direction of Arrow C, will reduce fuel delivery. The connection between the governor lever 12 and the fuel pump control rod 50 may be simple, as shown, or may involve other links, etc. Whatever the connection method, it is important that it has low friction and little backlash. Bushing 52 may be provided to enable the fuel pump control rod 50 to slide smoothly with low friction and wear.

The governor housing 10 also supports an actuator assembly 20, the diagram showing one embodiment where one part of the actuator housing 26 has a thread upon it. This thread engages with a threaded hole in the governor housing 10 thus enabling adjustment of the position of the actuator assembly 20 relative to the governor housing 10. The actuator is connected by pipe (not shown) leading from the intake manifold (not shown) to the other part of the housing 24 at connection 28. Increasing air pressure in the intake manifold will cause air to flow in the direction of the Arrow (A) thus increasing the pressure acting upon that side of the diaphragm 22. The diaphragm will then be urged in the direction of Arrow (A) by the increasing pressure force upon it, and unless the pressure force from the pressure of the fluid in the governor housing 10 increases at the same rate there will be an increase in the net force upon the diaphragm 22 urging it in the direction of Arrow (A). This force is applied via a collapsible link consisting of preloaded spring 34, headed pin 32 and washer 30, to the governor lever 12, thus urging it to rotate anticlockwise, hence urging the fuel pump control rod 50 in the direction of Arrow C, and reduced fuel delivery. The governor spring 16 opposes this motion of the governor lever 12, which is thus held in position by the opposing forces upon it. The diagram shows an all-speed governor where the other end of the governor spring 16 bears against a shoulder on the control input rod 40. As can be seen from the diagram it would be simple to increase the diameter and length of the governor spring 16 and position its other end against a static part of the governor assembly, thus creating an idle speed only governor.

To increase the engine's rotational speed the operator moves the control input rod 40 to the right, in direction of Arrow D. This further compresses governor spring 16 and increases its load upon the governor lever 12, urging it clockwise and moving the fuel pump control rod 50 in the direction of Arrow B, increased fuel delivery. As the engine speed increases, due to the extra fuel delivery, the pressure in the engine's intake manifold also increases and hence the net force, in the direction of arrow A, on the diaphragm 22 in the actuator assembly 20 increases. This urges the governor lever anticlockwise, the direction that causes reduction in fuel delivery. The engine is thus stably governed at an increased engine speed.

Further movement to the right of the control input rod 40 may cause the governor spring to be compressed to the point where the end of the control input rod 40 bears directly on the governor lever 12. At this point the governor no longer functions to control engine speed and the operator is now directly adjusting the fuel delivery of the pump. In the governed range the preload in spring 34 is reacted by tension in headed pin 32, the force being transferred through washer 30. As long as this preload is greater than the maximum load in the governor spring 16, when compressed to its minimum working length, spring 34 has no influence on the action of the governor. In those situations where the control input rod 40 bears directly against the governor lever 12 the operator now directly opposes the force produced by the actuator assembly 20. This may rise to a high level, especially with highly boosted engines and lead to an unacceptable force being required in the operating cable, linkages etc (not shown) and upon the operator. The action of spring 34 keeps this force at a lower level by reducing in length and allowing the diaphragm 22 to reach an end stop in the actuator assembly 20; in the diagram this end stop is the inside of actuator housing 26. The operator thus only opposes the force required to compress spring 34. The guide bushing 42 guides the control input rod 40 and acts as an end stop to limit the movement available to the operator.

Figure 3:
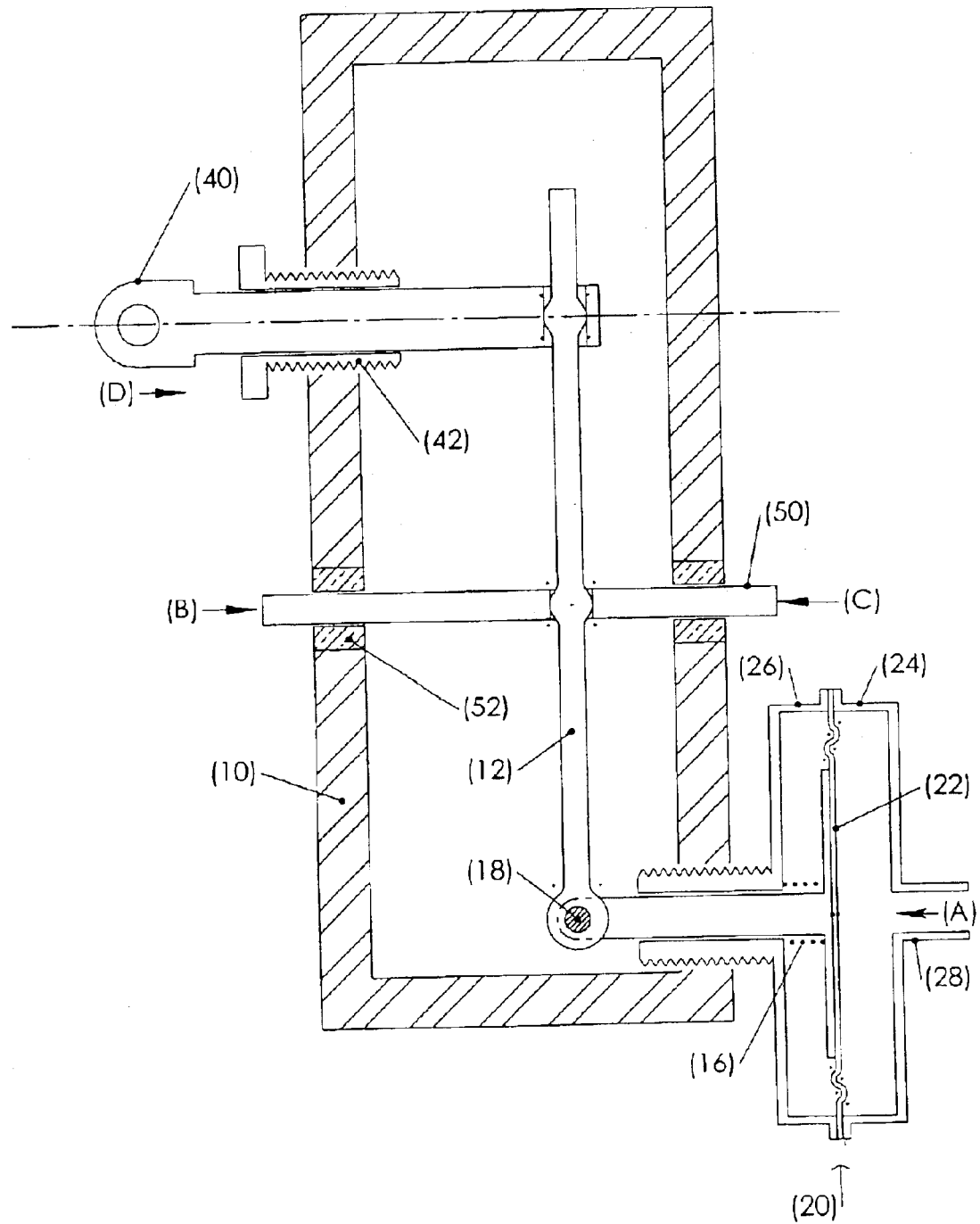
FIG. 3 is a schematic representation of a second embodiment of the invention of the "summing junction" type.

FIG. 3 shows a different embodiment of the invention, which also achieves all-speed governing, a summing mechanism being used rather than a force balance alone. Many of the components are the same as the embodiment discussed above and have the same functions, but the arrangement is different. Governor lever 12 is connected to the fuel control rod 50 similarly (as show in the diagram). The pivot 18 for the governor lever 12 is now attached to the output of the actuator assembly 20, there being no collapsible link. The operator moves the control input rod 40 in the same sense as in the previous embodiment, but this input rod is now connected to the governor lever 12; the connection may be similar to that between the governor lever and the fuel control rod 50 or it may be another type of low friction, low backlash joint.

Increasing intake manifold pressure urges the diaphragm 22 to the left, in direction of Arrow A, resulting in movement of the fuel control rod 50 to the left, in direction of Arrow C, reduced fuel delivery. Movement, by the operator, of the control input rod 40 to the right, in direction of Arrow D, moves the fuel control rod 50 to the right, in direction of Arrow B, increased fuel delivery. The governor spring 16 is now acting directly on the diaphragm 22 so that the position of the diaphragm is set by the force balance between the intake manifold pressure, the fluid pressure in the governor housing 10 and the governor spring force. Suitable, adjustable end stops (not shown) may be provided in the actuator assembly 20 to limit the movement of diaphragm 22. The governor spring 16 may be assembled into the actuator assembly 20 with a preload. The guide bush 42 guides the control input rod 40 and acts as an end stop to limit its movement.

While particular embodiments of the invention have been shown and described, numerous variations and alternative embodiments will occur to those skilled in the art. Accordingly, it is intended that the invention be limited only in terms of the appended claims.

What is claimed is:

1. A governor for controlling the fuel pump of a supercharged compression ignition internal combustion engine, comprising a pneumatic actuator having a member movable between predetermined end positions and having a first pressure side and a second pressure side, the first pressure side being fluidly connectable to a point between the engine's supercharger outlet and cylinders, the second pressure side being at a lower pressure than the first pressure side, the actuator producing a force via a mechanical outlet dependent upon the pressure acting across the member, the governor further including mechanical connecting means for connecting the mechanical outlet of the actuator to the control means of the engine's fuel pump such that an increase in the pressure on the first pressure side relative to the second pressure side acts so as to reduce the quantity of fuel delivered by the fuel pump to the engine.

2. The governor as set forth in claim 1 where the second pressure side of the actuator is connected to the atmosphere.

3. The governor as set forth in claim 1 where the second pressure side of the actuator is connected to a point in fluid terms between the atmosphere and the supercharger inlet.

4. The governor as set forth in claim 1 where the second pressure side of the actuator is connected to a governor casing.

5. The governor as set forth in claim 1 where the second pressure side of the actuator is connected to an engine casing.

6. The governor as set forth in any of claim 1 where the second pressure side of the actuator is connected to a fuel pump casing.

7. A fuel pump incorporating a governor as claimed in claim 1.

8. A compression ignition engine incorporating a governor as claimed in claim 1.

9. A two-stroke compression ignition engine incorporating a governor as claimed in claim 1.

10. An aircraft powered by a compression ignition engine as claimed in claim 8.

11. An aircraft powered by a compression ignition engine as claimed in claim 9.

* * * * *